US010694205B2

(12) United States Patent
He

(10) Patent No.: US 10,694,205 B2
(45) Date of Patent: Jun. 23, 2020

(54) ENTROPY CODING OF MOTION VECTORS USING CATEGORIES OF TRANSFORM BLOCKS

(71) Applicant: GOOGLE LLC, Mountain View, CA (US)

(72) Inventor: Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 280 days.

(21) Appl. No.: 15/845,307

(22) Filed: Dec. 18, 2017

(65) Prior Publication Data

US 2019/0191177 A1 Jun. 20, 2019

(51) Int. Cl.
*H04N 19/517* (2014.01)
*H04N 19/61* (2014.01)
*H04N 19/91* (2014.01)
*H04N 19/13* (2014.01)
*H04N 19/157* (2014.01)

(52) U.S. Cl.
CPC ......... *H04N 19/517* (2014.11); *H04N 19/13* (2014.11); *H04N 19/157* (2014.11); *H04N 19/61* (2014.11); *H04N 19/91* (2014.11)

(58) Field of Classification Search
None
See application file for complete search history.

(56) References Cited

U.S. PATENT DOCUMENTS 5,111,292 A * 5/1992 Kuriacose ............ H04N 5/4401
375/240.01
6,198,849 B1 * 3/2001 Fischer .................... H04N 7/54
348/404.1
(Continued)

FOREIGN PATENT DOCUMENTS

EP 2661088 A1 11/2013
WO 2013/103863 A1 7/2013

OTHER PUBLICATIONS

International Search Report and Written Opinion in PCT/US2018/051264, dated Dec. 5, 2018, 10 pgs.
(Continued)

*Primary Examiner* — Tyler W. Sullivan
(74) *Attorney, Agent, or Firm* — Young Basile Hanlon & MacFarlane, P.C.

(57) ABSTRACT

A method for inter-predicting a current block includes determining a motion vector and a reference frame for the current block, determining a transform block of transform coefficients for the current block, determining a category of the transform block, determining, using the category, a context for coding the motion vector, and encoding the motion vector using the context. The category is based on positions of non-zero coefficients of the transform coefficients. An apparatus for decoding a current block using inter prediction includes a memory and a processor. The memory includes instructions executable by the processor to decode a transform block for the current block, determine a category of the transform block, determine, using the category, a context for decoding a motion vector, decode the motion vector using the context, and inter-predict the current block using the motion vector. The category is based on positions of non-zero coefficients in the transform block.

20 Claims, 9 Drawing Sheets

(56) References Cited

U.S. PATENT DOCUMENTS

| | | | | |
|---|---|---|---|---|
| 7,936,818 | B2* | 5/2011 | Jayant | H04N 19/00 375/240.05 |
| 9,106,913 | B2* | 8/2015 | Sole Rojals | H04N 19/13 |
| 9,247,257 | B1* | 1/2016 | Wilkins | H04N 19/124 |
| 2002/0009143 | A1* | 1/2002 | Arye | H04N 21/23424 375/240.16 |
| 2007/0248164 | A1* | 10/2007 | Zuo | H04N 19/176 375/240.2 |
| 2008/0260028 | A1* | 10/2008 | Lamy-Bergot | H04N 21/8451 375/240.13 |
| 2009/0003447 | A1* | 1/2009 | Christoffersen | H04N 19/61 375/240.16 |
| 2012/0057634 | A1* | 3/2012 | Shi | H04N 19/52 375/240.16 |
| 2012/0195515 | A1* | 8/2012 | Ikai | H04N 19/176 382/238 |
| 2014/0140400 | A1* | 5/2014 | George | H04N 19/61 375/240.12 |
| 2015/0110173 | A1* | 4/2015 | Bultje | H04N 19/129 375/240.03 |
| 2016/0330479 | A1* | 11/2016 | Liu | H04N 19/597 |
| 2017/0302936 | A1* | 10/2017 | Li | H04N 19/142 |
| 2018/0213258 | A1* | 7/2018 | Xu | H04N 5/23238 |

OTHER PUBLICATIONS

Detlev Marpe et al., "Further Results for CABAC Entropy Coding Scheme", Video Coding Experts Group (VCEG) of ITU-T SG16, 13th Meeting, Apr. 2-4, 2001, Austin, TX, No. VCEG-M59 (Mar. 28, 2001), pp. 1-8.

Bankoski, et al., "Technical Overview of VP8, an Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

ENTROPY CODING OF MOTION VECTORS USING CATEGORIES OF TRANSFORM BLOCKS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame and a motion vector to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to improved coding of motion vectors.

A method for inter-predicting a current block of video includes determining a motion vector and a reference frame for the current block, determining a transform block of transform coefficients for the current block, determining a category of the transform block, determining, using the category, a context for coding the motion vector, and encoding the motion vector using the context. The category is based on positions of non-zero coefficients of the transform coefficients. The context includes a probability distribution used for entropy coding the motion vector.

An apparatus for encoding a current block of a video frame using inter prediction includes a non-transitory storage medium or memory and a processor. The memory includes instructions executable by the processor to determine a motion vector and a reference frame for the current block, determine a category of a transform block for the current block, determine, using the category, a context for encoding the motion vector, determining, using the category, a context for coding the motion vector, and encoding the motion vector using the context. The category is based on a size of the transform block. The context includes a probability distribution used for entropy coding the motion vector.

Another apparatus for decoding a current block using inter prediction includes a non-transitory storage medium or memory and a processor. The memory includes instructions executable by the processor to decode, from an encoded bitstream, a transform block for the current block, determine a category of the transform block, determine, using the category, a context for decoding a motion vector, decode, from the encoded bitstream, the motion vector using the context, and inter-predict the current block using the motion vector. The category is based on positions of non-zero coefficients in the transform block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
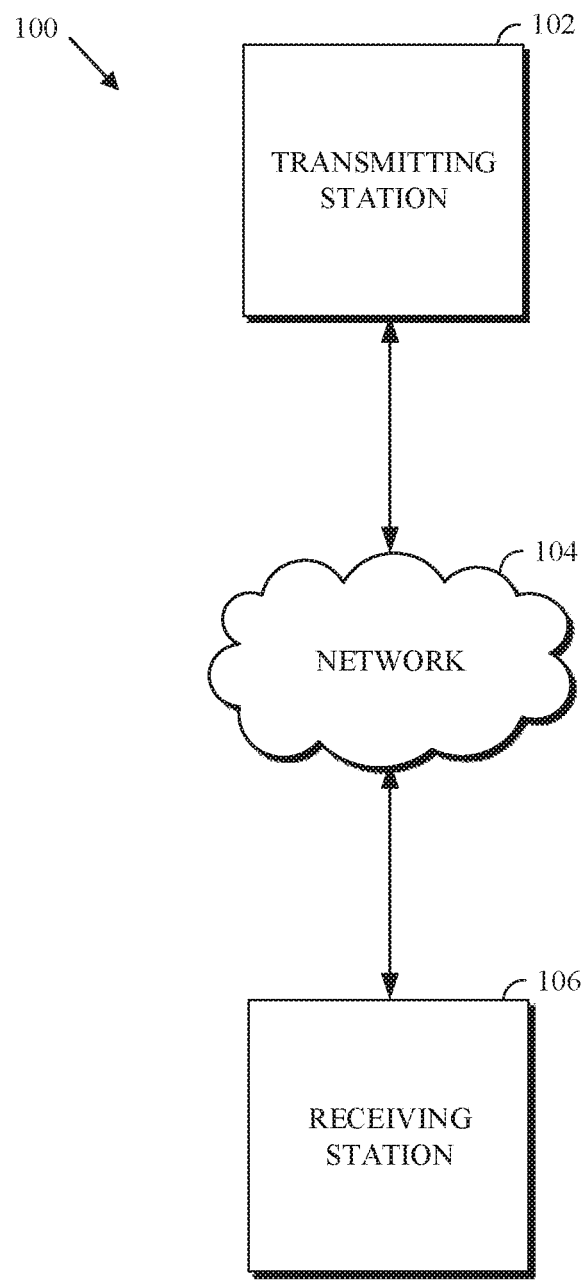
FIG. 1 is a schematic of a video encoding and decoding system.

A video stream can be compressed by a variety of techniques to reduce the bandwidth required to transmit or store the video stream. A video stream can be encoded into a bitstream (i.e., a compressed bitstream), which involves compression. The compressed bitstream can then be transmitted to a decoder that can decode or decompress the compressed bitstream to prepare it for viewing or further processing. Compression of the video stream often exploits spatial and temporal correlation of video signals through spatial and/or motion-compensated prediction. Motion-compensated prediction may also be referred to as inter prediction. Inter prediction uses one or more motion vectors to generate a block (also called a prediction block) that resembles a current block to be encoded using previously encoded and decoded pixels. By encoding the motion vector(s), and the difference between the two blocks (i.e., the current block and the prediction block), a decoder receiving the encoded signal can re-create the current block. The difference between the two blocks is referred to herein as the residual or the residual block.

Coding the residual block, as further described below, can include generating one or more transform blocks for the residual block. A transform block can include zero and non-zero transform coefficients. The transform coefficients are then encoded into the compressed bitstream. The residual block is typically in the pixel domain. A transform block is typically in the frequency domain.

Each motion vector used to generate a prediction block in the inter-prediction process refers to a frame (i.e., a reference frame) other than a current frame. Reference frames can be located before or after the current frame in the sequence (i.e., the display order) of the video stream, and may be frames that are reconstructed before being used as reference frames. A forward reference frame is a frame used for forward prediction relative to the sequence, while a backward reference frame is a frame used for backward prediction relative to the sequence. One or more forward and/or backward reference frames can be used to encode or decode a block. The efficacy of a reference frame when used to encode or decode a block (i.e., a current block) within a current frame can be measured based on a resulting signal-to-noise ratio or other measure of rate-distortion.

The motion vector(s) for a current block in motion-compensated prediction may be encoded into, and decoded from, the encoded bitstream. A motion vector for a current block (i.e., a block being encoded) is described with respect to a co-located block in a reference frame. The motion vector describes an offset (i.e., a displacement) in the horizontal direction (i.e., mv_x) and a displacement in the vertical direction (i.e., mv_y) from the co-located block in the reference frame. As such, a motion vector can be characterized as a 3-tuple (f, mv_x, mv_y) where f is indicative of (e.g., is an index of) a reference frame, mv_x is the offset in the horizontal direction, and mv_y is the offset in the vertical direction. As such, at least the offsets mv_x and mv_y are written (i.e., encoded) into the encoded bitstream and read (i.e., decoded) from the encoded bitstream.

To lower the rate cost of encoding the motion vectors, a motion vector may be encoded differentially. Namely, a motion vector is selected as a reference motion vector, and only a difference between the motion vector and the reference motion vector (also called the motion vector difference) is encoded into the bitstream. The reference motion vector may be a motion vector of one of the neighboring blocks, for example. The neighboring blocks can include spatial neighboring blocks (i.e., blocks in the same current frame as the current block). The neighboring blocks can include temporal neighboring blocks (i.e., blocks in frames other than the current frame).

In some situations, the prediction block that results in the best residual may not correspond with pixels in the reference frame. That is, the best motion vector may point to a location that is between pixels of blocks in the reference frame. In this case, motion compensated prediction at the sub-pixel level is useful. Motion compensated prediction may involve the use of a sub-pixel interpolation filter that generates filtered sub-pixel values at defined locations between the full pixels (also called integer pixels) along rows, columns, or both. The interpolation filter may be one of a number of interpolation filters available for use in motion compensated prediction. Sub-pixel interpolation is further described below with respect to FIGS. 6-8.

Different interpolation filters may be available. Each of the interpolation filters may be designed to provide a different frequency response. In an example, the available interpolation filters may include a smooth filter, a normal filter, a sharp filter, and a bilinear filter. The interpolation filter to be used by a decoder to generate a prediction block may be signaled in the header of the frame containing the block to be predicted. As such, the same interpolation filter is used to generate sub-pixel prediction blocks for all blocks of the frame. The interpolation filter may also be signaled at a coding unit level. As such, the same interpolation filter is used for every block (e.g., every prediction block) of the coding unit to generate sub-pixel prediction blocks for the blocks of the coding unit. An encoder may generate a prediction block based on each of the available interpolation filters. The encoder then selects (i.e., to signal to the decoder) the filter that results in, e.g., the best rate-distortion ratio. A rate-distortion ratio refers to a ratio that balances an amount of distortion (i.e., loss in video quality) with rate (i.e., the number of bits) required for encoding.

Coding a motion vector as used herein refers to the coding of the motion vector and to the differential coding of a motion vector. In either case, coding a motion vector includes coding the horizontal offset (i.e., mv_x) and coding the vertical offset (i.e., mv_y) of the motion vector. When implemented by an encoder, "coding" means encoding in an encoded bitstream. When implemented by a decoder, "coding" means decoding from an encoded bitstream.

Coding the motion vector can include entropy coding the horizontal offset and the vertical offsets of the motion vector. As such, a context is determined for the motion vector and a probability model, corresponding to the context, is used for the coding the motion vector.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

A purpose of context modeling is to obtain probability distributions for a subsequent entropy coding engine, such as arithmetic coding, Huffman coding, and other variable-length-to-variable-length coding engines. To achieve good compression performance, a large number of contexts may be required. For example, some video coding systems can include hundreds or even thousands of contexts for transform coefficient coding alone. Each context can correspond to a probability distribution.

A probability distribution can be learnt by a decoder and/or included in the header of a frame to be decoded.

Learnt can mean that an entropy coding engine of a decoder can adapt the probability distributions (i.e., probability models) of a context model based on decoded frames and/or decoded blocks. For example, the decoder can have available an initial probability distribution that the decoder (e.g., the entropy coding engine of the decoder) can continuously update as the decoder decodes additional frames. The updating of the probability models can insure that the initial probability distribution is updated to reflect the actual distributions in the decoded frames.

Including a probability distribution in the header can instruct the decoder to use the included probability distribution for decoding the next frame, given the corresponding context. A cost (in bits) is associated with including each probability distribution in the header. For example, in a coding system that includes 3000 contexts and that encodes a probability distribution (coded as an integer value between 1 and 255) using 8 bits, 24,000 bits are added to the encoded bitstream. These bits are overhead bits. Some techniques can be used to reduce the number of overhead bits. For example, the probability distributions for some, but not all, of the contexts can be included. For example, prediction schemes can also be used to reduce the overhead bits. Even with these overhead reduction techniques, the overhead is non-zero.

The efficiency of entropy coding can be directly related to the probability model. A model, as used herein, can be, or can be a parameter in, a lossless (entropy) coding. A model can be any parameter or method that affects probability estimation for entropy coding.

To avoid dependencies and complexities in the decoding of motion vectors, codecs may limit the information used (i.e., as context) to code motion vectors. The information can be limited to readily available information. For example, as reconstructed pixel values (further described below) are not readily available, they are not used as contextual information for selecting a probability model for coding motion vectors. Additionally, as the entropy decoder is typically much faster than any other processing in a video decoder, conditioning the entropy decoder on reconstructed pixels may result in significant performance degradation of the entropy decoder.

As such, it is typically desirable to condition the decoding (and, thus, encoding) a motion vector on, for example, the readily available inter-prediction modes and motion vectors of previously decoded blocks. The previously decoded blocks can be blocks in the spatial neighborhood and/or the temporal neighborhood of the current block being encoded. For example, in the case where blocks of a current frame are coded in raster scan order, the spatial neighborhood can include the top (i.e., above) and left neighboring blocks of the current block in the current frame. For example, the temporal neighborhood can include co-located blocks in previously coded frames (i.e., reference frames).

Several inter-prediction modes may be available. For example, one available inter-prediction mode represents that the motion vector of a block is 0. This may be referred to as a ZEROMV mode. Another inter-prediction mode may represent that the motion vector of the block is the reference motion vector. This may be referred to as a REFMV mode. When the motion vector for the block is not zero, and is different from the reference motion vector, the motion vector may be encoded using the reference motion vector. This mode may be referred to as a NEWMV mode herein. Other inter-prediction modes may be available.

The readily available information used for coding a motion vector can also include whether the current block is a luminance or chrominance block and the block size.

As mentioned above, filters having different frequency responses can be used to generate a motion vector at sub-pixel positions. Accordingly, and due to the use of these filters, reference blocks at different sub-pixel positions may have different characteristics in the transform domain. For example, a reference block at a sub-pixel position generated by a low-pass filter is likely to have lower energy in a high frequency band than a reference block at a full-pixel position. Since a residual block is the difference between a source block and a reference block, the energy distribution in the residual block is thus correlated with that of a reference block. As also mentioned above, the efficiency of entropy coding can be directly related to the probability model, which is in turn selected based on the context model.

From information theory, the entropy $H(X)$ can be a measure of the number of bits required to code the variable X; and the conditional entropy $H(X|Y)$ can be a measure of the number of bits required to code the variable X given that the quantity Y is known. $H(X)$ and $H(X|Y)$ are related by the well-known property $H(X|Y) \leq H(X)$. That is, the conditional entropy $H(X|Y)$ can never exceed $H(X)$. If X represents the motion vector and Y represents information contained in a transform block (e.g., or, equivalently, the residual), it follows that coding of the motion vector (i.e., X) may be improved by using the information contained in the transform block (i.e., Y). For example, the information contained in the transform block can be used as additional context information for coding the motion vector.

Implementations according to this disclosure can use information available in a transform block to code motion vectors associated with the residual block. Using the information available in the transform block can improve compression performance. Details of improved coding of motion vectors are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
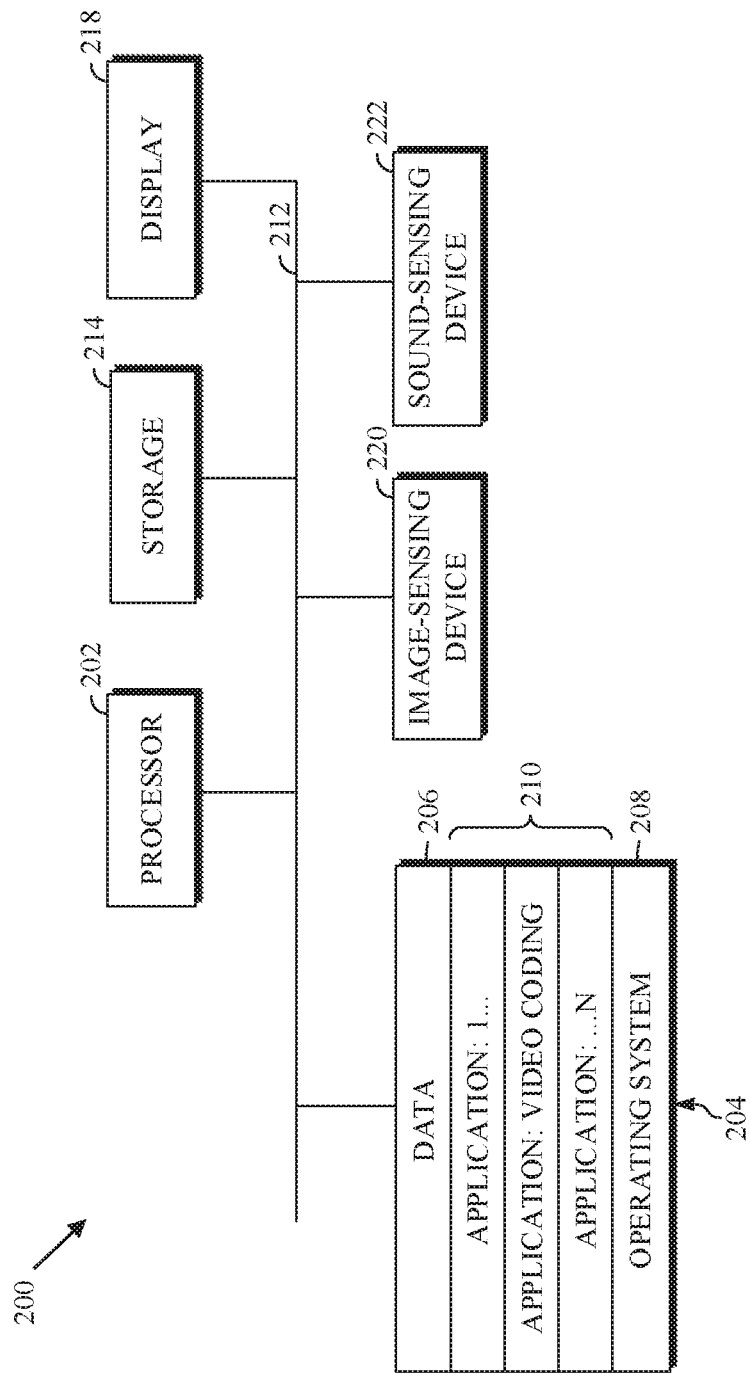
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A central processing unit (CPU) 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
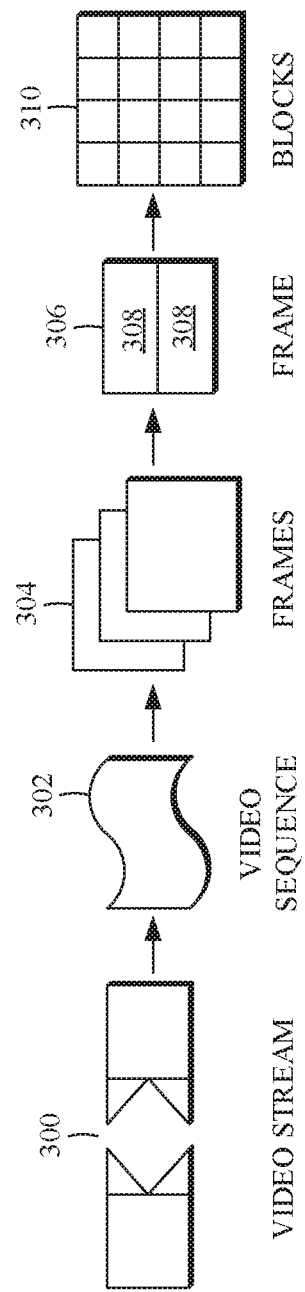
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
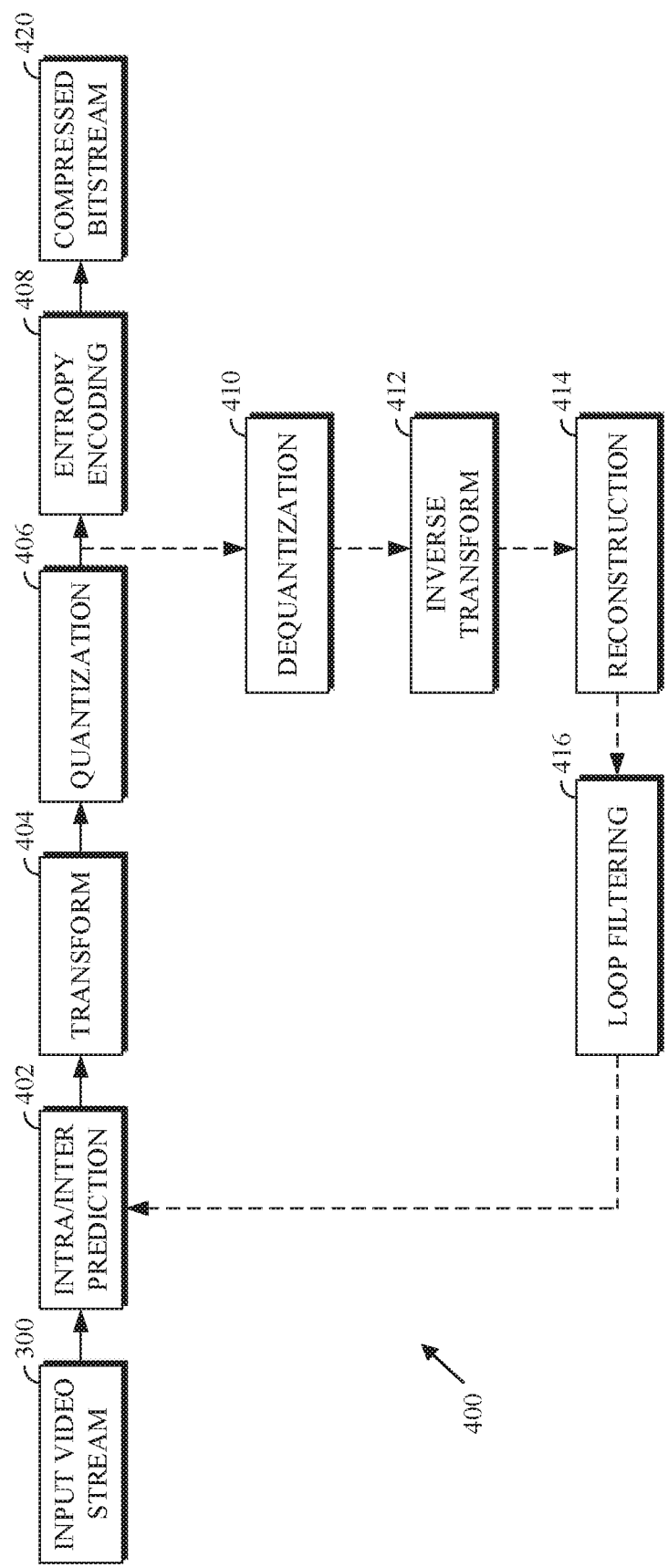
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 may be a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
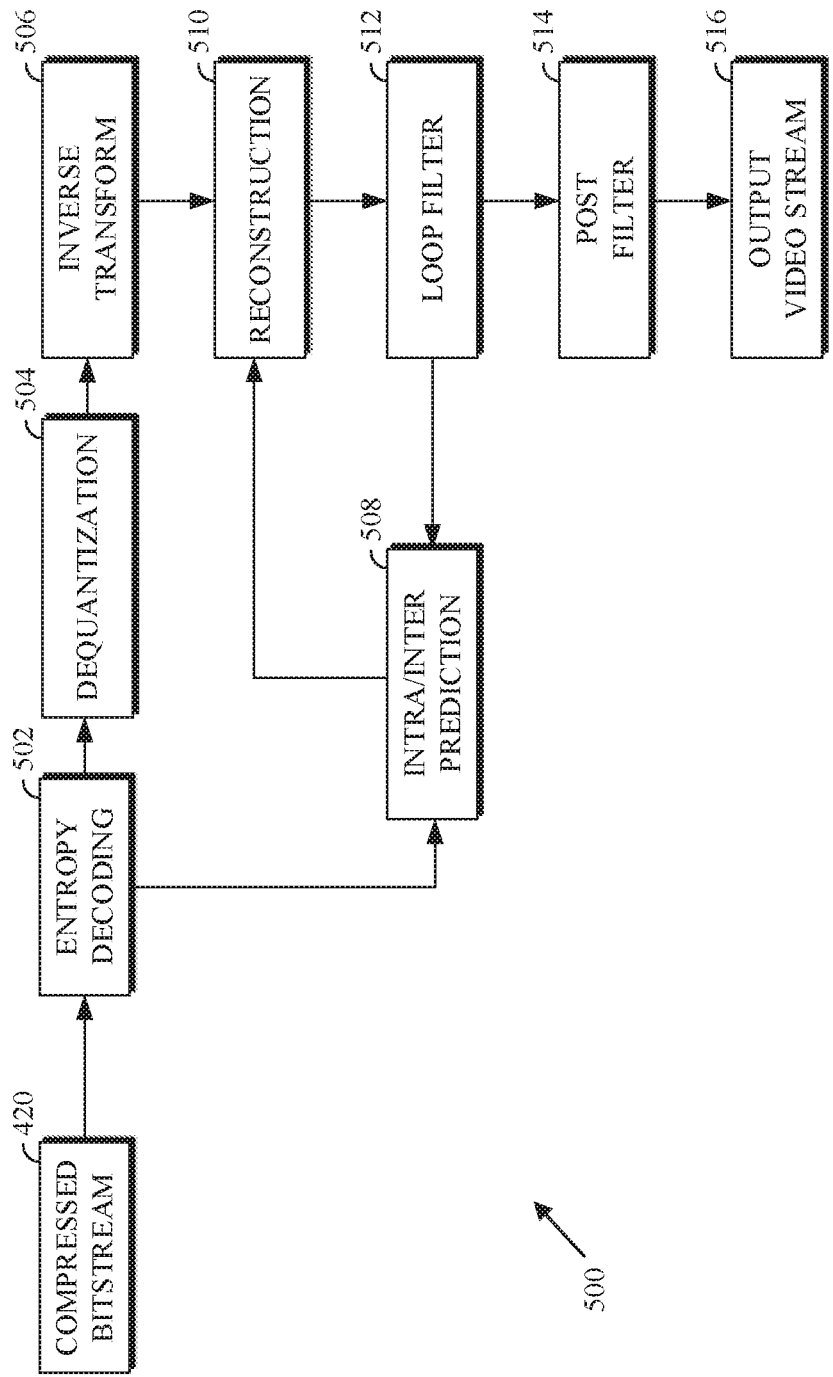
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500 may be a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Figure 6:
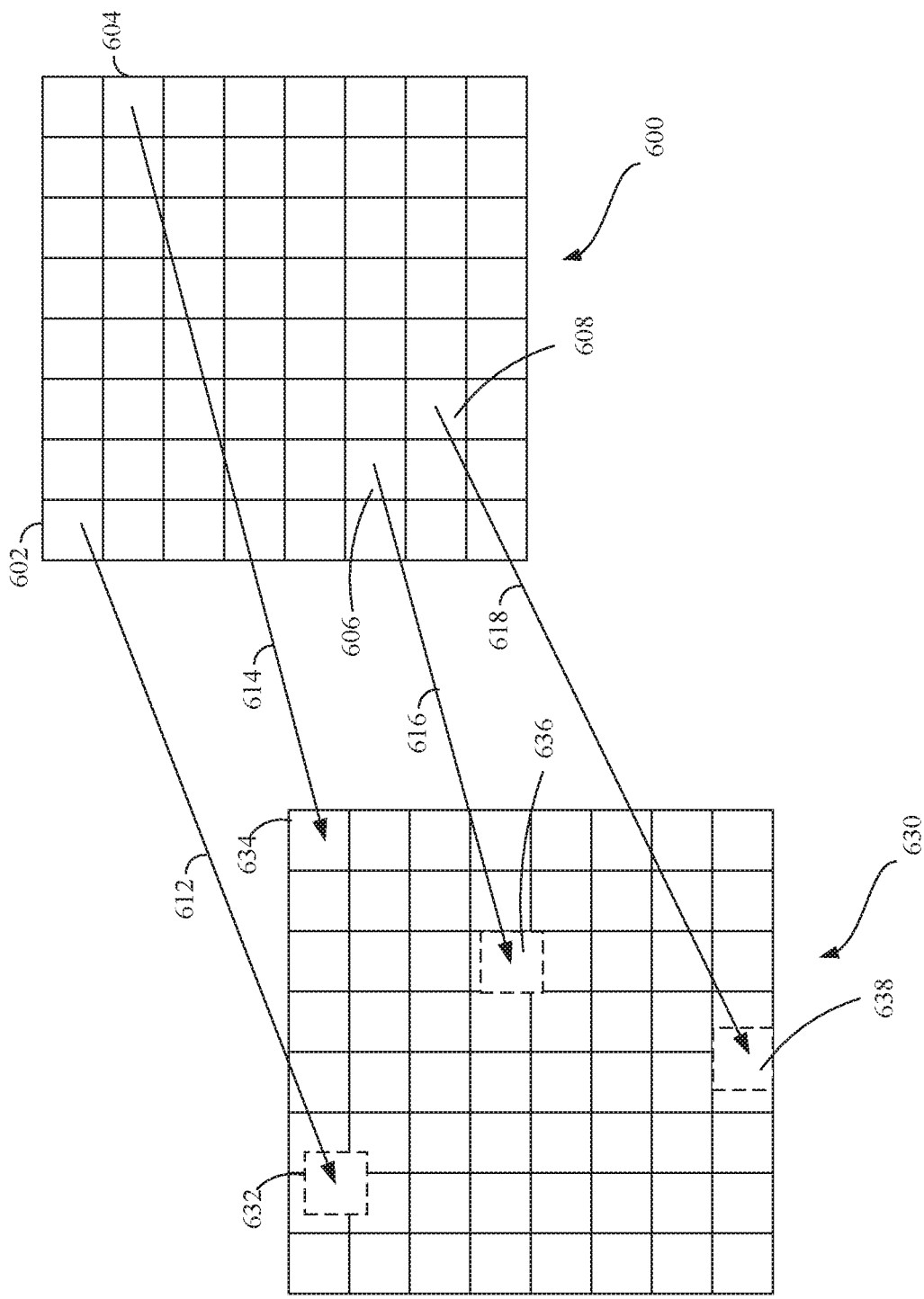
FIG. 6 is a diagram of motion vectors representing full and sub-pixel motion according to implementations of this disclosure.

Other filtering can be applied to the reconstructed block. In this example, the post filtering stage 514 can be a deblocking filter that is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514. FIG. 6 is a diagram of motion vectors representing full and sub-pixel motion according to implementations of this disclosure. In FIG. 6, several blocks 602, 604, 606, 608 of a current frame 600 are inter predicted using pixels from a reference frame 630. In this example, the reference frame 630 is a reference frame, also called the temporally adjacent frame, in a video sequence including the current frame 600, such as the video stream 300. The reference frame 630 is a reconstructed frame (i.e., one that has been encoded and decoded such as by the reconstruction path of FIG. 4) that has been stored in a so-called last reference frame buffer and is available for coding blocks of the current frame 600. Other (e.g., reconstructed) frames, or portions of such frames may also be available for inter prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516 of FIG. 5.

A prediction block 632 for encoding the block 602 corresponds to a motion vector 612. A prediction block 634 for encoding the block 604 corresponds to a motion vector 614. A prediction block 636 for encoding the block 606 corresponds to a motion vector 616. Finally, a prediction block 638 for encoding the block 608 corresponds to a motion vector 618. Each of the blocks 602, 604, 606, 608 is inter predicted using a single motion vector and hence a single reference frame in this example, but the teachings herein also apply to inter prediction using more than one motion vector (such as bi-prediction and/or compound prediction using two different reference frames), where pixels from each prediction are combined in some manner to form a prediction block.

Figure 7:
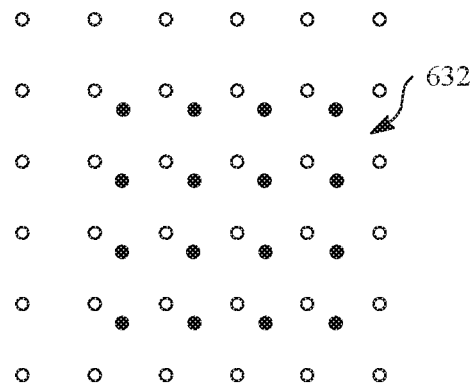
FIG. 7 is a diagram of a sub-pixel prediction block according to implementations of this disclosure.

FIG. 7 is a diagram of a sub-pixel prediction block according to implementations of this disclosure. FIG. 7 includes the block 632 and neighboring pixels of the block 632 of the reference frame 630 of FIG. 6. Integer pixels within the reference frame 630 are shown as unfilled circles. The integer pixels, in this example, represent reconstructed pixel values of the reference frame 630. The integer pixels are arranged in an array along x- and y-axes. Pixels forming the prediction block 632 are shown as filled circles. The prediction block 632 results from sub-pixel motion along two axes.

Generating the prediction block 632 can require two interpolation operations. In some cases, generating a prediction block can require only one interpolation operation along one of x and y axes. A first interpolation operation to generate intermediate pixels followed by a second interpolation operation to generate the pixels of the prediction block from the intermediate pixels. The first and the second interpolation operations can be along the horizontal direction (i.e., along the x axis) and the vertical direction (i.e., along the y axis), respectively. Alternatively, the first and the second interpolation operations can be along the vertical direction (i.e., along the y axis) and the horizontal direction (i.e., along the x axis), respectively. The first and second interpolation operations can use a same interpolation filter type. Alternatively, the first and second interpolation operations can use different interpolation filter types.

In order to produce pixel values for the sub-pixels of the prediction block 632, an interpolation process may be used. In one example, the interpolation process is performed using interpolation filters such as finite impulse response (FIR) filters. An interpolation filter may comprise a 6-tap filter, an 8-tap filter, or other size filters. The taps of an interpolation filter weight spatially neighboring pixels (integer or sub-pel pixels) with coefficient values to generate a sub-pixel value. In general, the interpolation filters used to generate each sub-pixel value at different sub-pixel positions (e.g., ½, ¼, ⅛, or other sub-pixel positions) between two pixels are different (i.e., have different coefficient values).

Figure 8:
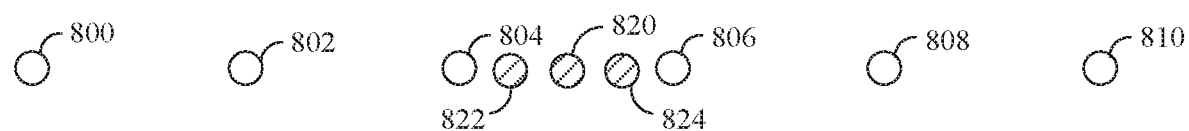
FIG. 8 is a diagram of full and sub-pixel positions according to implementations of this disclosure.

FIG. 8 is a diagram of full and sub-pixel positions according to implementations of this disclosure. In the example of FIG. 8, a 6-tap filter is used. This means that values for the sub-pixels or pixel positions 820, 822, 824 can be interpolated by applying an interpolation filter to the pixels 800-810. Only sub-pixel positions between the two pixels 804 and 806 are shown in FIG. 8. However, sub-pixel values between the other full pixels of the line of pixels can be determined in a like manner. For example, a sub-pixel value between the two pixels 806 and 808 may be determined or generated by applying an interpolation filter to the pixels 802, 804, 806, 808, 810, and an integer pixel adjacent to the pixel 810, if available.

Using different coefficient values in an interpolation filter, regardless of its size, results in different characteristics of filtering and hence different compression performance. In some implementations, the set of interpolation filters may be designed for 1/16-pixel precision and include at least two of a Bi-linear filter, an 8-tap filter (EIGHTTAP), a sharp 8-tap filter (EIGHTTAP_SHARP), or a smooth 8-tap filter (EIGHTTAP_SMOOTH). Each interpolation filter has a different frequency response.

Figure 9:
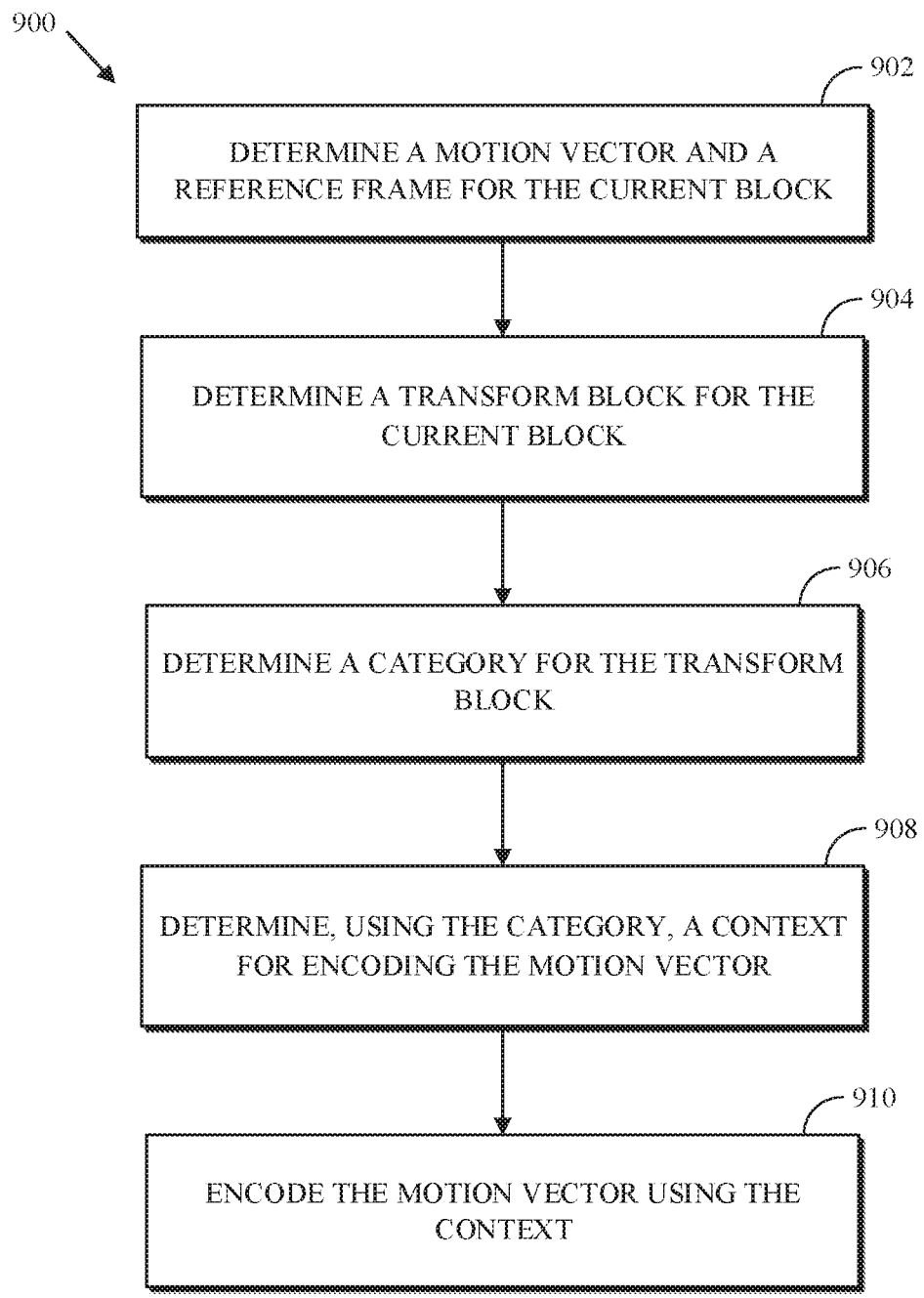
FIG. 9 is a flowchart diagram of a process for encoding a current block of a video frame using inter prediction according to an implementation of this disclosure.

FIG. 9 is a flowchart diagram of a method or process 900 for encoding a current block of a video frame using inter prediction. The process 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 900. The process 900 may be implemented in whole or in part in the entropy encoding stage 408 of the encoder 400. The process 900 can be implemented using specialized hardware or firmware. Multiple processors, memories, or both, may be used.

At operation 902, the process 900 determines a motion vector and a reference frame for the current block. As used in this disclosure, "determine" means to create, form, produce, select, construct, identify, specify, generate, receive, or other determine in any manner whatsoever. For example, the process 900 can receive the motion vector and the reference frame for the current block as described with respect to the intra/inter prediction stage 402 of FIG. 4.

Determining the reference frame for the current block may include selecting one reference frame of multiple available reference frames for predicting the current block. In some implementations, a reference frame buffer may store up to a defined number of available reference frames, such as four or eight reference frames. As one example, the reference frame buffer may store a LAST reference frame, corresponding to the last frame before the current frame in a video sequence, a GOLDEN reference frame, corresponding to an intra-predicted frame located before the current frame in the video sequence, and an alternate or alternative reference frame designated as ALTREF_FRAME. An alternative reference frame may be a frame of a video sequence that is distant from a current frame in a display order, but is encoded or decoded earlier than it is displayed. For example, the alternative reference frame may be ten, twelve, or more (or fewer) frames after the current frame in a display order of the video sequence. Further alternative reference frames can be frames located nearer to the current frame in the display order.

An alternative reference frame may not correspond directly to a frame in the sequence. Instead, the alternative reference frame may be generated using one or more frames having filtering applied, being combined together, or being both combined together and filtered. An alternative reference frame may not be displayed. Instead, the alternative frame can be a frame or portion of a frame generated and transmitted for use only for prediction (i.e., it is omitted when the decoded sequence is displayed).

A reference frame buffer may be able to store additional or fewer reference frames. For example, the available spaces may store a second last frame (i.e., the first frame before the last frame) and/or a third last frame (i.e., a frame two frames before the last frame) as additional forward prediction reference frames (e.g., in addition to the LAST and GOLDEN reference frames). In some examples, a backward frame may be stored as an additional backward prediction reference frame (e.g., in addition to the ALTREF_FRAME reference frame). The terms LAST, GOLDEN, ALTREF_FRAME, etc., may be referred to as reference frame identifiers herein.

The motion vector can be determined using a method of motion estimation, such as a motion search. In the motion search, a portion of a reference frame can be translated to a succession of locations to form respective prediction blocks that can be subtracted from the current block to form respective residuals. The horizontal and/or vertical translations corresponding to the location having, e.g., the smallest, residual can be selected as the motion vector.

As indicated above, the prediction block that results in the best residual may not correspond with pixels (i.e., integer pixels) in the reference frame. That is, the best motion vector may point to a location that is between pixels of blocks in the reference frame. In this case, motion compensated prediction at the sub-pixel level is useful. Motion compensated prediction may involve the use of a sub-pixel interpolation filter that generates filtered sub-pixel values at defined locations between the full pixels (also called integer pixels) along rows, columns, or both. The interpolation filter may be one of a number of interpolation filters available for use in motion compensated prediction, where each of the interpolation filters has a different frequency profile (i.e., a different frequency response).

At operation 904, the process 900 generates a transform block for the current block. The transform block, as used herein, refers to a quantized transform block. For example, as described with respect to the intra/inter prediction stage 402 of FIG. 4, a prediction block corresponding to the motion vector and the reference frame is generated. The prediction block can then be transformed and quantized as described, respectively, with respect to the transform stage 404 and the quantization stage 406 of FIG. 4.

At operation 906, the process 900 determines a category of the transform block. Any number of categories may be available. In an example, the category can be determined based on the positions of non-zero coefficients in the transform block (i.e., the quantized transform block).

The transform block can be organized as a two-dimensional block. Let (x, y) denote a transform block position in the transform domain, and let c(x, y) denote a transform coefficient at position (x, y). It is noted that in the case of a decoder (such as described with respect to FIG. 10), c(x, y) denotes a decoded transform coefficient at location (x, y). The transform coefficient at location (0, 0) is referred to as the DC coefficient; a coefficient at any other location is referred to as an AC coefficient. A transform coefficient that has a positive or a negative value (i.e., a value that is not zero) is referred to as a "non-zero coefficient."

In an example, the category is selected from a set that includes the categories DC_ONLY, AC_LOW, AC_HIGH_X, AC_HIGH_Y, and AC_HIGH. To "select from a set" means to select one of the possible values DC_ONLY, AC_LOW, AC_HIGH_X, AC_HIGH_Y, and AC_HIGH. The category can be used as contextual information to code the motion vector associated with the residual block. Specifically, coding of horizontal offset mv_x and/or the vertical offset mv_y may depend upon the category. For example, the category can be used in combination with other readily available information (as described above) as contextual information to code the motion vector. Example semantics of the categories DC_ONLY, AC_LOW, AC_HIGH_X, AC_HIGH_Y, and AC_HIGH are described below. However, other semantics are also possible.

The category DC_ONLY can indicate that the transform block does not have non-zero AC coefficients. That is, the only non-zero coefficient of the transform is the DC coefficient (i.e., the coefficient at location (0, 0)). As such, in a DC_ONLY transform block, c(x, y)=0 if x !=0 or y !=0.

The category AC_LOW can indicate that the transform block does not have non-zero coefficients at high frequency positions. In an AC_LOW transform block, there are no non-zero transform coefficients in columns that are greater than a horizontal threshold (i.e., T_x) and there are no non-zero transform coefficients in rows that are greater than a vertical threshold (i.e., T_y). As such, in an AC_LOW transform block, c(x, y)=0 if x>T_x or Y>T_y. The AC_LOW category can be roughly interpreted as there are non-zero coefficients only in the upper left portion of the transform block. The thresholds T_x and T_y are further described below.

The category AC_HIGH_X can indicate that the residual block does not have non-zero coefficients in row numbers that are greater than a threshold (i.e., T_y) and has at least one non-zero coefficient in at least one column that is larger than a threshold (i.e., T_x). That is, c(x, y)=0 if y>T_y, and c(x, y) !=0 at some (x, y) where x>T_x. The AC_HIGH_X category can be roughly interpreted as there are non-zero coefficients in the top-right portion of the transform block but there are no non-zero transform coefficients in the lower half of the transform block.

The category AC_HIGH_Y can indicate that the residual block does not have non-zero coefficients in column numbers that are greater than a threshold (i.e., T_x) and has at least one non-zero coefficient in at least one row that is larger than a threshold (i.e., T_y). That is, c(x, y)=0 if x>T_x, and c(x, y) !=0 at some (x, y) where y>T_y. The AC_HIGH_Y category can be roughly interpreted as there are non-zero coefficients in the bottom-left portion of the transform block but there are no non-zero transform coefficients in the right half of the transform block.

The AC_HIGH category can indicate that the transform block has a non-zero coefficient at some (x, y) where x>T_x and y>T_y. The AC_HIGH category can be roughly interpreted as there are non-zero coefficients in the bottom-right portion of the transform block.

In an example, the horizontal threshold (i.e., T_x) and/or the vertical threshold (i.e., T_y) can be based on the size of the transform block. As such, the category can be further based on a size of the transform block. For example, the horizontal threshold, T_x, can be related to the width of the transform block and the vertical threshold, T_y, can be related to the height of the transform block. The relationship can be a linear relationship. For example, the horizontal threshold, T_x, can be selected as half the width of the transform block. For example, the vertical threshold, T_y, can be selected as half the height of the transform block. Other linear relationships are possible.

The horizontal threshold, T_x, and the vertical threshold, T_y, can be based on the filter that is selected for sub-pixel interpolation. As the frequency response of the selected filter has a bearing on the distribution of the non-zero coefficients, the horizontal threshold, T_x, and the vertical threshold, T_y can be set based on the frequency response. That is, the threshold values can be designed (e.g., set, selected, etc.) to correspond to the statistics of the selected filter used to generate the sub-pixel reference block. For example, if the selected filter is a low-pass filter whose frequency response has a falling cliff at half of the full frequency band, then the horizontal threshold, T_x, can be set to half the width of the transform block. For example, if the filter has a narrower frequency response band that is closer to the DC position, then the horizontal and the vertical thresholds can have values that are closer to the DC position.

In an example, in a case where the prediction block is based on full pixel positions, the horizontal and vertical thresholds can be based on a linear relationship to the width and height of the transform block, respectively, as described above; and in a case of sub-pixel interpolation, the thresholds can be selected based on the selected interpolation filter (i.e., based on the response characteristics of the selected filter).

At operation 908, the process 900 determines, using the category, a context for coding the motion vector. In an implementation, the same context can be used to encode the horizontal offset (i.e., mv_x) and the vertical offset (i.e., mv_y) of the motion vector.

As mentioned above, full-pixel and sub-pixel motion vectors can have different response characteristics in the frequency domain. The response characteristics can be reflected in the residual block and, equivalently, in the transform block. As such, the correlation between the motion vector and the frequency domain characteristics can be used to encode the motion vector. The correlation can similarly be used in other direction. That is in some situations, the motion vector information can be used to encode the transform coefficients of the transform block.

The category can be used alone or in combination with other information for determining the context. For example, as described above, one or more of inter-prediction modes of neighboring blocks, motion vectors of motion blocks, the current block type (e.g., chrominance or luminance), and/or the current block size can be used in combination with the category as contextual information for determining the context. Other contextual information can be combined with the category to determine the context.

In an implementation, determining a context can include determining a context index. The context index can be used to retrieve a context model from a list of available context models. The combination of the values of the contextual information can map to an index value. One or more combination of values can map to the same index value. That is, one or more contextual information combinations can map to the same context model.

At operation 910, the process 900 encodes the motion vector using the context. The motion vector can be encoded in a compressed bitstream, such as the compressed bitstream 420 of FIG. 4. In an implementation, the same context can be used for encoding the horizontal offset (i.e., mv_x) and the vertical offset (mv_y) of the motion vector.

In an implementation, a residual block (and, equivalently, a transform block) can be separately categorized according to its energy distribution in each of the horizontal dimension and the vertical dimension. As such, determining the category at operation 906 can include determining a horizontal category of the transform block and determining a vertical category for the transform block. Accordingly, determining the context at operation 908 can include determining, using the horizontal category, a horizontal context for coding the horizontal offset of the motion vector; and determining, using the vertical category, a vertical context for coding the vertical offset of the motion vector. Accordingly, encoding the motion vector at operation 910 can include using the horizontal context for coding the horizontal offset of the motion vector and using the vertical context for coding the vertical offset of the motion vector.

In an implementation, the horizontal category can be selected from a set that includes the categories DC_ONLY, AC_LOW_X, and AC_HIGH_X; and the vertical category can be selected from a set that includes the categories DC_ONLY, AC_LOW_Y, and AC_HIGH_Y.

In another implementation, the horizontal category can be selected from a set that includes the categories AC_LOW_X and AC_HIGH_X; and the vertical category can be selected from a set that includes the categories AC_LOW_Y and AC_HIGH_Y. Using a smaller number of categories can reduce the number of contexts. Reducing the number of contexts can avoid the so-called context dilution problem. The contexts mentioned above can have the following semantics.

The category DC_ONLY can indicate, as described above, that the transform block does not have non-zero AC coefficients. That is, the only non-zero coefficient of the transform is the DC coefficient (i.e., the coefficient at location (0, 0)). As such, in a DC_ONLY transform block, $c(x, y)=0$ if $x \mathrel{!}=0$ or $y \mathrel{!}=0$.

The category AC_LOW_X can indicate that the transform block does not have non-zero coefficients at high frequency positions. In an AC_LOW_X transform block, there are no non-zero coefficients in columns that are greater than a horizontal threshold (i.e., T_x). As such, in an AC_LOW_X transform block, $c(x, y)=0$ if $x>T\_x$. The AC_LOW_X category can be roughly interpreted as there are no non-zero coefficients in the right portion of the transform block.

The category AC_HIGH_X can indicate that the transform block has at least one non-zero coefficient in column with large column numbers. In an AC_HIGH_X transform block, there is at least one no non-zero coefficients in columns that are greater than a horizontal threshold (i.e., T_x). As such, in an AC_HIGH_X transform block, $c(x, y) \mathrel{!}=0$ at some $(x, y)$ where $x>T\_x$. The AC_HIGH_X category can be roughly interpreted as there is at least one non-zero coefficient in the right portion of the transform block.

The category AC_LOW_Y can indicate that the transform block does not have non-zero coefficients at high frequency positions. In an AC_LOW_Y transform block, there are no non-zero coefficients in rows that are greater than a vertical threshold (i.e., T_y). As such, in an AC_LOW_Y transform block, $c(x, y)=0$ if $y>T\_y$. The AC_LOW_Y category can be roughly interpreted as there are no non-zero coefficients in the lower portion of the transform block.

The category AC_HIGH_Y can indicate that the transform block has at least one non-zero coefficient in rows with large row numbers. In an AC_HIGH_Y transform block, there is at least one no non-zero coefficients in rows that are greater than a vertical threshold (i.e., T_y). As such, in an AC_HIGH_Y transform block, $c(x, y) \mathrel{!}=0$ at some $(x, y)$ where $y>T\_y$. The AC_HIGH_Y category can be roughly interpreted as there is at least one non-zero coefficient in the bottom portion of the transform block.

The horizontal threshold (i.e., T_x) and the vertical threshold (i.e., T_y) can be as described above.

Referring again to the operation 904. In some situations, more than one transform block may be associated with the current block. That is, the current block may be consumed by multiple transform blocks. For example, a transform operation, such as performed by the transform stage 404 of FIG. 4, may perform a set of transforms of different sizes such that the current block is divided into (i.e., corresponds to) smaller transform blocks than the current block or such that the transform block is of the same size as the current block. For example, a current block of size 8×8 may be consumed by four 4×4 transform blocks. Other current block sizes and transform block sizes are possible. A current block being consumed by multiple transform blocks indicates that the frequency component in the current block is high. When the frequency component is high, it is preferable to use smaller transform sizes (i.e., smaller in size than the current block).

In the case where multiple transform blocks correspond to the current block, determining a transform block for the current block at operation 904, can mean selecting one of the transform blocks associated with the current block.

In an implementation, any one of the transform blocks may be selected. In another implementation, the transform block with the highest AC component is selected. For example, the transform block with the highest number of non-zero coefficients can be selected.

In yet another implementation, a respective category is determined (such as described with respect to the operation 908) for each of the transform blocks. It is noted that the categories (as described above) form a progression with respect to locations of non-zero coefficients in the transform block. For example, in the set of {DC_ONLY, AC_LOW_X, AC_HIGH_X}, an AC_LOW_X transform block includes more positions than a DC_ONLY transform block where non-zero coefficients may appear, and an AC_HIGH_X includes more positions than an AC_LOW_X block where non-zero coefficients may appear. As such, the transform block having the highest category (i.e., the highest number of non-zero transform coefficients) is selected. In the set of categories {DC_ONLY, AC_LOW, AC_HIGH_X, AC_HIGH_Y, AC_HIGH}, the progression can be given by DC_ONLY, AC_LOW, AC_HIGH_X, AC_HIGH_Y, and AC_HIGH such that the AC_HIGH is the highest category and DC_ONLY is the lowest category. The categories AC_HIGH_X and AC_HIGH_Y can be equal categories.

In another implementation, a respective category is determined for each of the transform blocks, and the category to be used in motion vector coding is selected by using a voting process. An example voting process is as follows: each transform block casts one vote for its category; and the category that receives the most votes is selected. In another example, the vote casted by each transform block is weighted by a factor in proportion to the transform block size, and the category receives the most weighted votes is selected.

As described above, the transform coefficients (i.e., information in the transform block) are used to encode the motion vector. As such, the process 900 can encode (e.g., add, write, etc.) the transform coefficients into the compressed bitstream before the motion vector information. In this way, a decoder can decode the transform coefficients first in order to determine the category for the transform block. The decoder can use the category to decode the motion vector.

In some implementations, the process 900 can encode the category in the compressed bitstream. The category can be encoded for all blocks or for some blocks. While, as described above, a correlation (e.g., a statistical correlation) exists between the residual block (and, equivalently, the transform block) and the motion vector, the correlation may not be exact (i.e., non-deterministic). In such situations, it can be useful to encode the category in order to improve the coding efficiency.

The encoding of the category can depend on the transform coefficients. For example, the number of non-zero coefficients in the transform block can be used to determine a context for coding the category. For example, the transform type can be used to determine the context for coding the category. Conditioning the encoding of the category on the transform coefficients can limit the cost (i.e., in bits) associated with the encoding of the category.

A codec can use multiple transform types. A transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, one-dimensional Discrete Sine Transform DST (1D DST) or its approximation, a two-dimensional DCT (2D DCT) or its approximation, two-dimensional DST (2D DST) or its approximation, and an identity transform. Other transform types can be available. In an example, a one-dimensional transform (1D DCT or 1D DST) can be applied in one dimension (e.g., row or column) and the identity transform applied in the other dimension.

Figure 10:
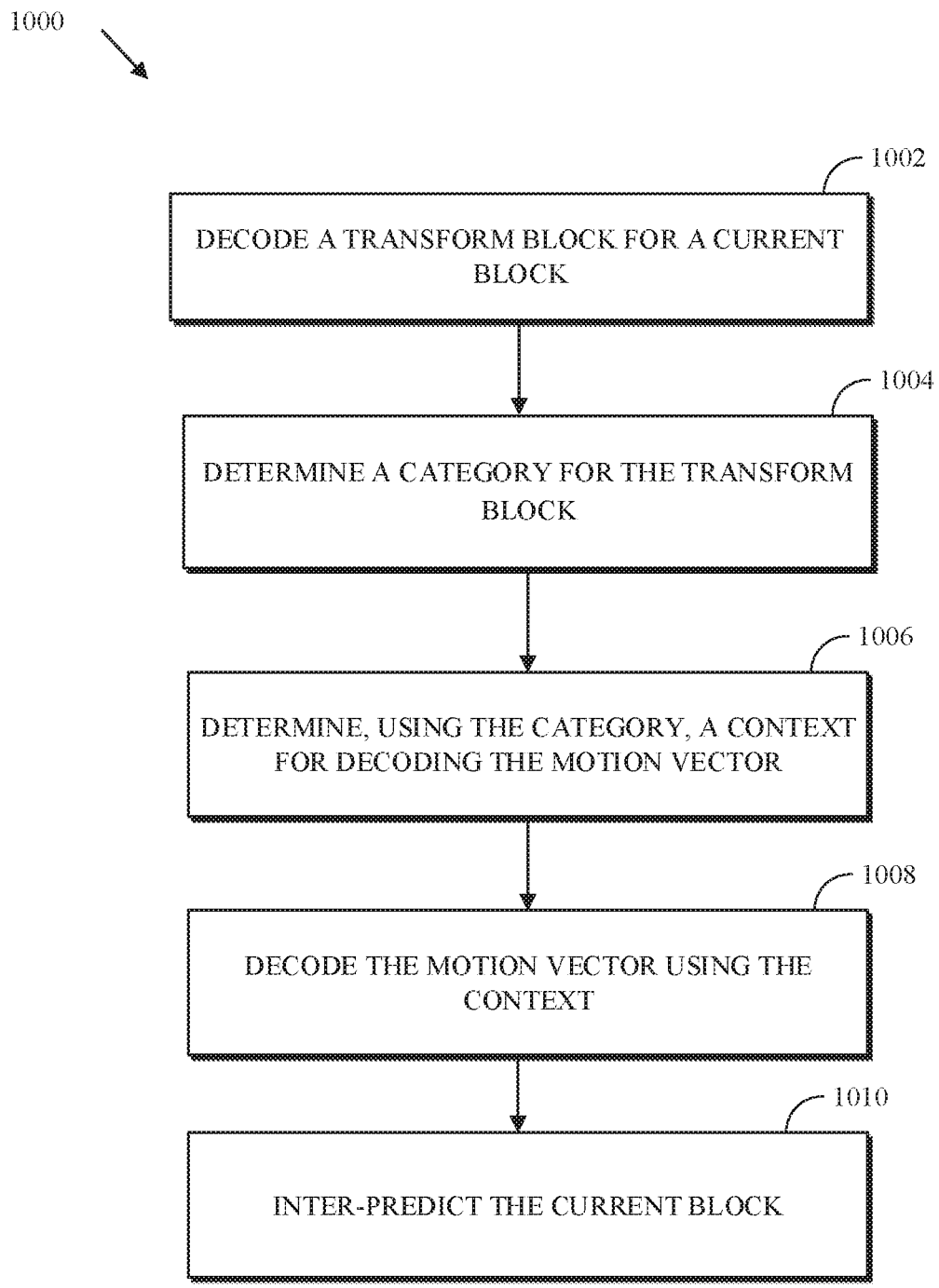
FIG. 10 is a flowchart diagram of a process for decoding a current block of a video frame using inter prediction according to an implementation of this disclosure.

FIG. 10 is a flowchart diagram of a method or process 1000 for decoding a current block of a video frame using inter prediction. The process 1000 can be used to decode a motion vector used for inter predicting the current block. The motion vector includes a horizontal offset (i.e., mv_x) and a vertical offset (i.e., mv_y). The process 1000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 900. The process 1000 may be implemented in whole or in part in the entropy decoding stage 502 of the decoder 500. The process 1000 can be implemented using specialized hardware or firmware. Multiple processors, memories, or both, may be used.

At operation 1002, the process 1000 decodes a transform block for the current block. For example, using a scan order, the process 1000 can decode transform coefficients from an encoded bitstream, such as the compressed bitstream 420 of FIG. 5. As used herein, the transform coefficients can be quantized transform coefficients. The process 1000 can decode transform coefficients until an end-of-block syntax element is decoded or until all the transform coefficients of the transform block have been decoded, whichever comes first. In the case that the end-of-block syntax element is decoded, then the process 1000 can set all remaining transform coefficients of the transform block to zero.

Any number of methods can be used to decode the transform coefficients so long as the encoder that generated the compressed bitstream and the decoder use the same method. For example, a binary token tree can be used to code the transform coefficients. For example, an alphabet of non-binary symbols can be used to code the transform blocks. For example, one or more syntax elements can be coded for a transform coefficient based on the magnitude of the transform coefficient.

At operation 1004, the process 1000 determines a category for the transform block. In an implementation, the category can be determined as described with respect to operation 906 of FIG. 9. In an example, the category can be determined based on positions of non-zero coefficients in the transform block. In an example, the category can be based on the size of the transform block. In an example, the category can be based on the positions of non-zero coefficients in the transform block and the size of the transform block.

In an implementation, and as similarly described with respect to the process 900, determining the category can mean decoding the category from the compressed bitstream. The transform coefficients decoded at operation 902 can be used to decode the category.

As described with respect to FIG. 9, the category can be selected from a set that includes the categories DC_ONLY, AC_LOW, AC_HIGH_X, AC_HIGH_Y, and AC_HIGH.

At operation 1006, the process 1000 determines a context for decoding the motion vector using the category. The context can be determined as similarly described with respect to 908 of FIG. 9.

At operation 1008, the process 1000 decodes the motion vector using the context. In an implementation, the context can be used to decode the horizontal offset (i.e., mv_x) and the vertical offset (i.e., mv_y) of the motion vector. At 1010, the process 1000 can inter-predict the current block as described, for example, with respect to the intra/inter prediction stage 508 of FIG. 5.

In an implementation, a residual block (and, equivalently, a transform block) can be separately categorized according to its energy distribution in each of the horizontal dimension and the vertical dimension. As such, determining the category at operation 1004 can include determining a horizontal category of the transform block and determining a vertical category for the transform block. Accordingly, determining the context at operation 1006 can include determining, using the horizontal category, a horizontal context for coding the horizontal offset of the motion vector; and determining, using the vertical category, a vertical context for coding the vertical offset of the motion vector. Accordingly, decoding the motion vector at operation 1008 can include using the horizontal context for coding the horizontal offset of the motion vector and using the vertical context for coding the vertical offset of the motion vector.

In an implementation, the horizontal category is selected from a set that includes the categories DC_ONLY, AC_LOW_X, and AC_HIGH_X, and the vertical category is selected from a set that includes the categories DC_ONLY, AC_LOW_Y, and AC_HIGH_Y.

In an implementation, the horizontal category is selected from a set that includes the categories AC_LOW_X and AC_HIGH_X, and the vertical category is selected from a set that includes the categories AC_LOW_Y and AC_HIGH_Y.

As described above, in some situations, a current block may be consumed by multiple transform blocks. As such, in an implementation, determining the category of the transform block includes determining a first category for a first transform block for the current block, determining a second category for a second transform block for the current block, and selecting the one of the first category and the second category corresponding to a higher category.

For simplicity of explanation, the processes 900 and 1000 are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for inter-predicting a current block of video, comprising:
    determining a motion vector and a reference frame for the current block;
    determining a transform block of transform coefficients for the current block;
    determining a category of the transform block, wherein the category is one of:
        a first category (DC_ONLY) indicating that the transform block includes a non-zero coefficient only at a position (0, 0);
        a second category (AC_LOW) indicating that the transform block does not include non-zero coefficients at positions (x, y) where x is greater than a first threshold and y is greater than a second threshold;
        a third category (AC_HIGH_X) indicating that the transform block does not include non-zero coefficients at positions (x, y) where y is greater than the second threshold and includes at least one non-zero coefficient where x is greater than the first threshold;
        a fourth category (AC_HIGH_Y) indicating that the transform block does not include non-zero coefficients at positions (x, y) where x is greater than the first threshold and includes at least one non-zero coefficient where y is greater than the second threshold; and
        a fifth category (AC_HIGH) indicating that the transform block includes at least one non-zero coefficient at a position (x, y) where x is greater than the first threshold and y is greater than the second threshold;
    determining, using the category, a context for coding the motion vector, the context comprising a probability distribution used for entropy coding the motion vector; and
    encoding the motion vector using the context.

2. The method of claim 1, wherein the category is further determined based on a size of the transform block.

3. The method of claim 1,
    wherein the motion vector comprises a horizontal offset and a vertical offset, and
    wherein
    encoding the motion vector using the context comprising:
        encoding the horizontal offset using the category; and
        encoding the vertical offset using the category.

4. The method of claim 1, wherein the categories DC_ONLY, AC_LOW, AC_HIGH_X, AC_HIGH_Y, and AC_HIGH form a progression with respect to locations of the non-zero coefficients in the transform block.

5. The method of claim 4, wherein determining a category of the transform block comprising:
    selecting the one of the categories DC_ONLY, AC_LOW, AC_HIGH_X, AC_HIGH_Y, and AC_HIGH corresponding to a highest category of the progression.

6. An apparatus for encoding a current block of a video frame using inter prediction, comprising:
    a memory;
    a processor, the memory includes instructions executable by the processor to:
        determine a motion vector and a reference frame for the current block, the motion vector comprising a horizontal offset and a vertical offset;
        determine a horizontal category of a transform block for the current block, wherein the horizontal category is selected from a first set comprising:
            a first category (AC_LOW_X) indicating that the transform block does not include non-zero coefficients at positions (x, y) where x is greater than a first threshold; and
            a second category (AC_HIGH_X) indicating that the transform block includes at least one non-zero coefficient at a position (x, y) where x is greater than the first threshold;
        determine, using the horizontal category, a first context for encoding the motion vector;
        determine a vertical category of the transform block, wherein the vertical category is selected from a second set comprising:
            a third category (AC_LOW_Y) indicating that the transform block does not include non-zero coefficients at positions (x, y) where y is greater than a second threshold; and
            a fourth category (AC_HIGH_Y) indicating that the transform block includes at least one non-zero coefficient at a position (x, y) where y is greater than the second threshold;
        determine, using the vertical category, a second context for encoding the motion vector;
        encode, in a compressed bitstream, the horizontal offset of the motion vector using the first context; and
        encode, in the compressed bitstream, the vertical offset of the motion vector using the second context.

7. The apparatus of claim 6, wherein the horizontal category and the vertical category are further determined based on positions of non-zero coefficients in the transform block.

8. The apparatus of claim 4, wherein to determine the horizontal category or to determine the vertical category of the transform block for the current block comprises to:
    determine a first category for a first transform block for the current block;
    determine a second category for a second transform block for the current block; and
    select the one of the first category and the second category corresponding to a higher category.

9. The apparatus of claim 6,
    wherein the second set further comprises:
        a fifth category (DC_ONLY) indicating that the transform block includes a non-zero coefficient only at a position (0, 0).

10. The apparatus of claim 6,
    wherein the first set further comprises:
        a fifth category (DC_ONLY) indicating that the transform block includes a non-zero coefficient only at a position (0, 0).

11. The apparatus of claim 10, wherein the categories DC_ONLY, AC_LOW_X, and AC_HIGH_X form a progression with respect to locations of the non-zero coefficients in the transform block, and wherein to determine the horizontal category of a transform block comprises to:

selecting the one of the categories DC_ONLY, AC_LOW_X, and AC_HIGH_X corresponding to a highest category of the progression.

12. The apparatus of claim 9, wherein the categories DC_ONLY, AC_LOW_Y, and AC_HIGH_Y form a progression with respect to locations of the non-zero coefficients in the transform block, and wherein to determine the vertical category of a transform block comprises to:
selecting the one of the categories DC_ONLY, AC_LOW_Y, and AC_HIGH_Y corresponding to a highest category of the progression.

13. An apparatus for decoding a current block using inter prediction, comprising:
a memory;
a processor, the memory includes instructions executable by the processor to:
decode, from an encoded bitstream, a transform block for the current block;
determine a category of the transform block, the category based on positions of non-zero coefficients in the transform block, wherein the category is one of:
a first category (DC_ONLY) indicating that the transform block includes a non-zero coefficient only at a position (0, 0);
a second category (AC_LOW) indicating that the transform block does not include non-zero coefficients at positions (x, y) where x is greater than a first threshold and y is greater than a second threshold;
a third category (AC_HIGH_X) indicating that the transform block does not include non-zero coefficients at positions (x, y) where y is greater than the second threshold and includes at least one non-zero coefficient where x is greater than the first threshold;
a fourth category (AC_HIGH_Y) indicating that the transform block does not include non-zero coefficients at positions (x, y) where x is greater than the first threshold and includes at least one non-zero coefficient where y is greater than the second threshold;
a fifth category (AC_HIGH) indicating that the transform block includes at least one non-zero coefficient at a position (x, y) where x is greater than the first threshold and the y is greater than the second threshold;
a sixth category (AC_LOW_X) indicating that the transform block does not include non-zero coefficients at positions (x, y) where x is greater than a third threshold;
a seventh category (AC_HIGH_X) indicating that the transform block includes at least one non-zero coefficient at a position (x, y) where x is greater than the third threshold;
an eighth category (AC_LOW_Y) indicating that the transform block does not include non-zero coefficients at positions (x, y) where y is greater than a fourth threshold;
a ninth category (AC_HIGH_Y) indicating that the transform block includes at least one non-zero coefficient at a position (x, y) where y is greater than the fourth threshold;
determine, using the category, a context for decoding at least one of a horizontal offset of a motion vector or a vertical offset of the motion vector;
decode, from the encoded bitstream, at least one of the horizontal offset of the motion vector or the vertical offset of the motion vector using the context; and
inter-predict the current block using the motion vector.

14. The apparatus of claim 13, wherein to determine the category of the transform block comprises to:
determine a first category for a first transform block for the current block;
determine a second category for a second transform block for the current block; and
select the one of the first category and the second category corresponding to a higher category.

15. The apparatus of claim 13, wherein the category is further determined based on a size of the transform block.

16. The apparatus of claim 13, wherein the category is selected from a set comprising DC_ONLY, AC_LOW, AC_HIGH_X, AC_HIGH_Y, and AC_HIGH.

17. The apparatus of claim 13,
wherein to determine the category of the transform block comprises to:
determine a horizontal category of the transform block, the horizontal category used to determine a horizontal context for coding the horizontal offset; and
determine a vertical category of the transform block, the vertical category used to determine a vertical context for coding the vertical offset.

18. The apparatus of claim 17,
wherein the horizontal category is selected from a first set comprising DC_ONLY, AC_LOW_X, and AC_HIGH_X, and
wherein the vertical category is selected from a second set consisting comprising DC_ONLY, AC_LOW_Y, and AC_HIGH_Y.

19. The apparatus of claim 18, wherein the categories DC_ONLY, AC_LOW_X, and AC_HIGH_X form a first progression with respect to locations of the non-zero coefficients in the transform block, and wherein the categories DC_ONLY, AC_LOW_Y, and AC_HIGH_Y form a second progression with respect to the locations of the non-zero coefficients in the transform block.

20. The apparatus of claim 17,
wherein the horizontal category is selected from a first set comprising AC_LOW_X and AC_HIGH_X, and
wherein the vertical category is selected from a second set comprising AC_LOW_Y and AC_HIGH_Y.

* * * * *